Sept. 13, 1932.  N. AVAKIAN  1,876,829
SIGNAL OPERATING MECHANISM
Filed March 26, 1928  2 Sheets-Sheet 2

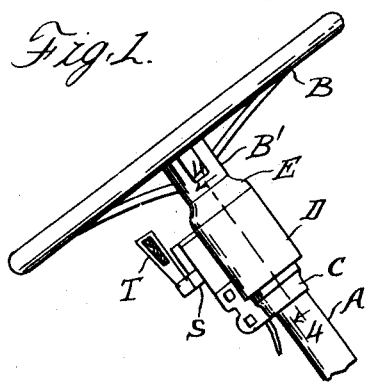
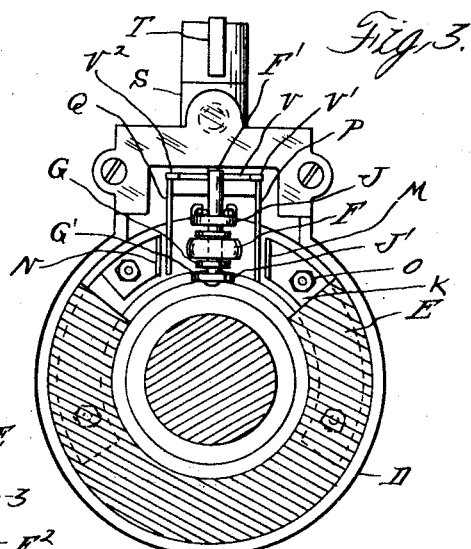
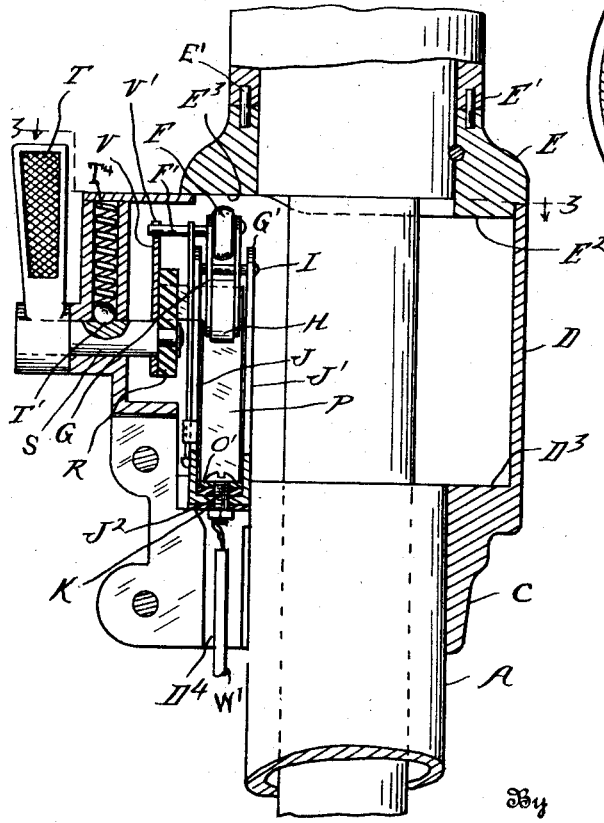

Inventor
Nashan Avakian
By Swan Frye and Murray
Attorneys

Patented Sept. 13, 1932

1,876,829

UNITED STATES PATENT OFFICE

NESHAN AVAKIAN, OF DETROIT, MICHIGAN

SIGNAL OPERATING MECHANISM

Application filed March 26, 1928. Serial No. 264,927.

This invention relates to signal-operating mechanism for motor vehicle use, and has for its object an improved organization of parts by means of which the driver may, from a convenient point on the steering post of the vehicle, set in operation the signals indicating his intention as to either stopping or turning to the right or left, well in advance of the location of such halt or turn, which signal-setting is automatically followed up in the case of turns by a circuit-closing movement brought about by the turning of the steering wheel, and which at the same time trips back into neutral position the manually set signaling circuit mechanism first used, ready for re-use upon the occasion of the next halt or turn, without the necessity of the driver's remembering to so set the handle or lever which he first actuated, and thus leaving his mind free to deal with current traffic conditions rather than any manual adjustment of the parts.

In the drawings:

Figure 1 is a side elevational view of a steering wheel and its post, with my improved setting device in place thereon.

Figure 2 is a sectional elevation thereof on a considerably large scale than that shown in Figure 1.

Figure 3 is a plan view taken along the line 3—3 of Figure 2 and looking in the direction of the arrows there shown.

Figure 4:
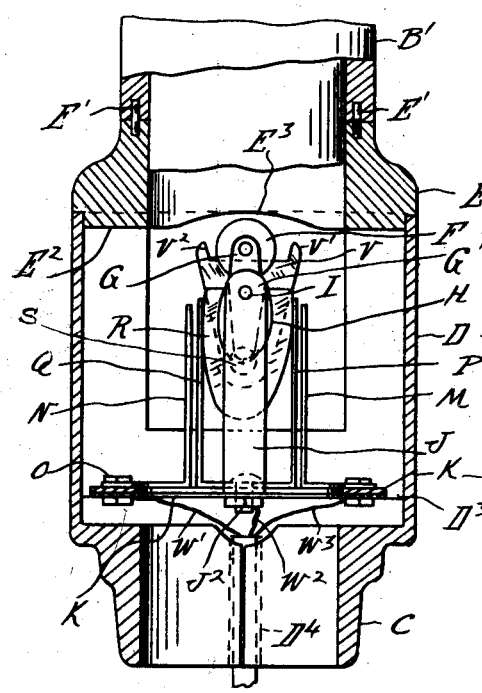

Figure 4 is an interior sectional elevation taken along the line 4—4 of Figure 1, and looking in the direction of the arrows there shown, the scale upon which the parts are shown being, like that of Figures 2 and 3, much larger than the showing of the corresponding part of Figure 1.

Figure 5:
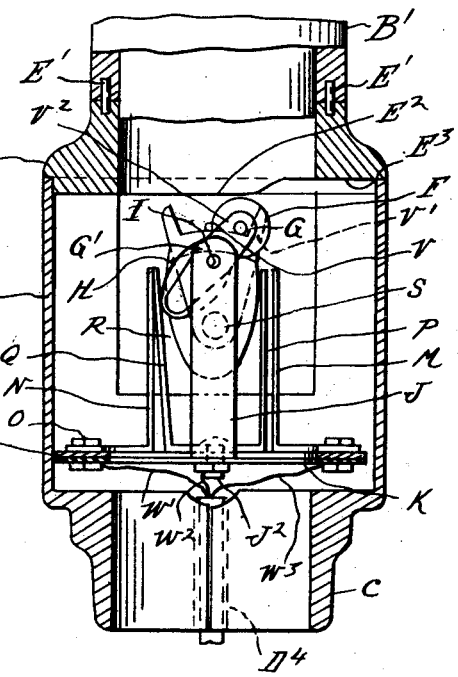

Figure 5 is a view similar to Figure 4, showing the signal light closure parts in actuated position.

Figure 6:
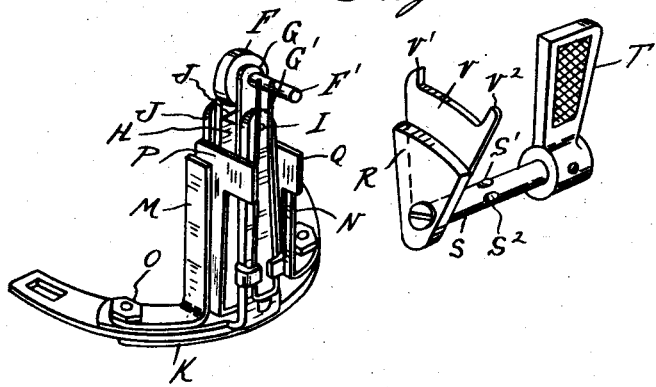

Figure 6 is a perspective of the manually actuated lever and its connected segmental piece shown adjacent but operatively disassociated from the tripping and light closure elements.

A indicates a steering post of a motor vehicle, and B the hand wheel positioned at the top thereof. At C is shown a screw-and-nut-drawn-collar by means of which the shell or casing D is held in suitable position about the top of the steering post. Above the shell D is located a second collar E, which is structurally associated with the integral hub or neck portion B' of the steering wheel by means of the pins E'. As brought out particularly in Figures 2, 4, and 5 the under face of this collar E, which is rotatable relatively to the top edge of the shell D upon which it rests, is formed a partial ridge or elevated portion $E^2$, which does not continue in this form through a complete circle, but is slopingly depressed or cut away as at $E^3$, rides non-frictionally or non-engagingly over the top of the roller F which is carried in bearings G' upon the top of the lever G. This latter, as brought out particularly in Figure 2, is preferably formed of two slightly spaced parallel pieces, between whose upper ends the roller F is positioned, and between the lower ends of which is similarly supported an insulating disc or trip piece H. This lever G is in turn pivotally supported at or near its center by means of the pin I between a pair of upstanding branches J and J' of a U-shaped piece, whose center or bridge portion is held in place relatively to the shell D by the screw bolt $J^2$, though insulated from it by the washer K, which, as brought out particularly in Figures 3 and 6, is preferably formed as a continuous circular strip which extends perhaps one-third or nearly a half of the way about the circle ledge $D^3$ of the shell whereon it rests. Rising from an insulated circuit near either end of this semi-circular washer K, and held in place thereon by nut-crowned screws O, are a pair of resilient contact pieces M and N which lie roughly parallel with, though slightly spaced from, another pair of upright pieces P and Q, which are preferably formed as integral parts of a U-shaped structure, whose central or bridge portion is insulated from the corresponding bridge portion uniting the parts J and J' by the washer O'. As brought out particularly in Figure 6, these upstanding branches P and Q are each of roughly L-shaped contour, so as to project to flanking positions relatively to the wedge-shaped piece R of fiber or other insulating material and to the wedge-shaped piece V of metal, provided with corner projections or catch portions $V^1$ and $V^2$, both mounted upon the handle T so that when this latter is in central or neutral position the points $V^1$ and $V^2$ are out of engagement with the small shaft $F^1$ upon which the roller F is mounted in the top of the built up lever G, and which projects forwardly therefrom sufficiently to be engaged by these projections $V^1$ and $V^2$ whenever the handle T is thrown to either angular position, representing either a right hand turn or a left hand turn. The handle T is yieldingly held in central or neutral position by the spring-pressed engagement of the ball $T^1$ in a correspondingly positioned depression as $S^1$ in the shaft S, the ball being compelled to ride outwardly therefrom onto the plain periphery of shaft whenever the latter is turned in either direction by actuation of the handle T.

Downwardly through the hole $D^4$ in the shell D or casing lead a series of insulated circuit wires such as $W^1$, $W^2$, and $W^3$ which are connected respectively with the U-shaped structure formed by the arms J and J' and with the assembly bolts O which hold the upwardly rising pieces M and N in position. The circuits represented by each of these cords are normally open, that represented by the cord $W^1$ being appurtenant to the stop light or tail light, whereas that represented by the cord $W^2$ may be considered as connected with a part of the light-signaling mechanism carried on the rear of the car, which is designed to be illuminated by the setting of the mechanism indicating a turn to the left, while the circuit represented by the wire $W^3$ is similarly designed to be responsive to the setting of the mechanism which illuminates the right hand turn lighting element. No attempt is made to illustrate any particular form of rear light signaling fixture for these wires, as any one of several forms could be used equally advantageously in connection with this device, it being thought sufficient to merely indicate the leading of the several wires theretowards from the apparatus with which this application is particularly concerned.

The operation of this mechanism is as follows: With the handle T and consequently the shaft S in neutral position, the roller supporting lever G is in the upright position shown in Figures 4 and 6, and consequently the wedge-shaped fiber piece R is either wholly out of contact with the rearwardly projecting ends of the upstanding branches P and Q, or in harmless, slight contact therewith. Similarly these branches P and Q are out of contact with the respective spaced upstanding pieces M and N, consequently neither of the circuits $W^2$ or $W^3$ are closed, and neither the right hand nor the left hand light signal is in operation. When, however, the driver of the vehicle is approaching a street intersection, perhaps half a block away, at which he desires to turn, he first throws the handle T to the right or left accordingly, thus throwing one of the points of the wedge-shaped fiber piece R against the corresponding projection of the piece Q, in case a left hand turn is to be signaled. This is thus pressed against its corresponding and spacedly adjacent upstanding piece N and the circuit $W^2$ is closed accordingly, illuminating the left hand turn light signal at the rear of the vehicle, and giving ample warning in advance to other nearby drivers of his intention to turn at the next street. As soon, however, as he has reached that street, and has begun to turn his steering wheel B accordingly, the structural union therewith of the collar E, which has been already described, results in turning the low or non-ridged portion $E^3$ of the under face of the collar E from its previous position above the roller F and forcing to ride thereover in its place the adjacent end of the ridge, as $E^2$, which is of sufficient downward extent to trip the lever supported roller F to the right. This actuated movement throws the end of the stem or shaft F' into contact with the adjacent point V' of the wedge-shaped piece V which is also carried by the shaft S in close relation to the wedge-shaped fiber piece R, which has pressed the upstanding spring Q into contact with its companion upstanding piece N, and consequently throws the shaft S and with it the handle T back to neutral position again, the ball T' being displaced from the hole $S^2$ in the shaft and forced to ride over the unbroken periphery thereof until its spring $T^4$ can force it down into the hole $S^1$ representing the neutral position of the shaft and its lever. In other words, by this movement the hand-actuated lever first set by the driver back in the middle of the block has now been neutralized and counteracted and the lever is again ready for actuation by the driver the next time he desires to turn, without having to give further thought to its turning back to neutral position. Thereafter the depression of the pivoted lever G whereon the roller F is carried continues so long as the steering wheel and its rod are in left turning position, that is to say, as long as the high part $E^2$ of the ledge instead of the cut-away part $E^3$ is positioned over the roller F. As soon, however, as the steering wheel has been straightened when the vehicle's turn has been completed, the repositioning of the low part $E^3$ of the collar E over the roller F enables its return to the neutral position shown in Figure 4, and resultantly ends the circuit-closing contact between the resilient parts Q and N, thus opening the circuit $W^2$ once more, and ending the illumination of the light indicating a left hand turn.

It is obvious that the same results would be secured as to the circuit W³, representing a right hand turn, in case the throwing of the lever F in the shaft S to the right instead of the left resulted in the closure of that circuit through the forced engagement with one another of the resilient upstanding parts P and N, due to the engagement of the former by the opposite corner of the wedge-shaped fiber R from that whose action upon the parts appurtenant the left hand turning signal has just been described.

What I claim is:

1. A signal-control switch for mounting upon the steering post of a motor vehicle, comprising a substantially cylindrical shell for housing the switch and encircling the steering post, a pair of upstanding resilient contact arms supported by and within said shell and normally spaced and insulated from each other, a manually operable handle having a connecting portion extending through and from said shell, a sector plate within the shell and connected to the handle causing movement of one of said resilient contact arms to force it into contact with the other, a combined tripping and cam member having a portion engageable with the sector plate for moving the same in the opposite direction, thereby releasing its holding engagement with the contact arm, and having another portion engageable with the same contact arm to retain it in the position in which it was previously held by the sector plate.

2. In combination with a steering shaft, steering wheel, and supporting steering post, a control switch for mounting upon the steering post, comprising a housing, a pair of resilient contact arms supported within the housing and normally spaced and insulated from each other, an operating member also mounted within the housing and adjacent one of the resilient arms, means controllable at will from outside the housing for moving the operating member to force one of said resilient arms into contact with the other, means for maintaining the operating member in such position, a projection carried by the operating member, a combined cam and tripping member within the housing and engageable both with the projection carried by the operating member and with the same contact arm, said cam tripping member being actuatable by the turning movement of the steering wheel to similarly force said contact arms into mutual engagement, and to release the operating member.

3. In combination with the steering post, steering shaft and steering wheel of a motor vehicle, a control switch for a plurality of electrical circuits mounted on the post and comprising a housing, a plurality of pairs of elongated resilient contact arms therewithin normally spaced and insulated from each other, a main operating member having a portion thereof adjacent one arm of each pair of contacts, means controllable from outside the housing for so moving the main operating member as to force whichever of said contact arms is desired into engagement with its mate, thereby closing any one of a plurality of electrical circuits at will, means for maintaining the main operating member in such position, and a combined cam and tripping member actuatable by the steering shaft and adapted to release the main operating member but to maintain the contacts actuated thereby in closed position during movement of the shaft a predetermined extent.

In testimony whereof I sign this specification.

NESHAN AVAKIAN.